(12) United States Patent
Howell

(10) Patent No.: US 10,038,313 B2
(45) Date of Patent: Jul. 31, 2018

(54) LINEMAN'S HOIST

(71) Applicant: Preston Howell, Alachua, FL (US)

(72) Inventor: Preston Howell, Alachua, FL (US)

(*) Notice: Subject to any disclaimer, the term of this patent is extended or adjusted under 35 U.S.C. 154(b) by 25 days.

(21) Appl. No.: 14/753,631

(22) Filed: Jun. 29, 2015

(65) Prior Publication Data
US 2016/0380415 A1 Dec. 29, 2016

(51) Int. Cl.
*H02G 1/04* (2006.01)

(52) U.S. Cl.
CPC ..................................... *H02G 1/04* (2013.01)

(58) Field of Classification Search
CPC .......... F16G 11/12; B25B 25/00; B60P 7/083; Y10T 403/291; Y10T 403/293; H02G 1/04
USPC .......................................................... 254/389
See application file for complete search history.

(56) References Cited

U.S. PATENT DOCUMENTS

| | | | | |
|---|---|---|---|---|
| 1,494,170 A * | 5/1924 | Kearney | F16G 11/12 | 254/236 |
| 2,872,224 A * | 2/1959 | Osborne | F16G 11/12 | 403/40 |
| 3,065,007 A * | 11/1962 | Colmer, Jr. | F16G 11/12 | 24/279 |
| 3,217,840 A * | 11/1965 | Holkesvick | A62B 1/06 | 182/5 |
| 3,338,359 A * | 8/1967 | Baillie | B60P 7/083 | 192/43.1 |
| 3,863,892 A * | 2/1975 | Di Martino | F16G 11/12 | 254/101 |
| 4,030,705 A * | 6/1977 | Bontrager | B66F 19/00 | 180/298 |
| 4,062,520 A * | 12/1977 | Patterson, III | B60P 7/0838 | 24/269 |
| 4,069,902 A * | 1/1978 | Zdeb | F16D 41/16 | 192/43 |
| 4,103,871 A * | 8/1978 | Patterson, III | B60P 7/083 | 254/266 |
| 4,130,269 A * | 12/1978 | Schreyer | F16G 11/12 | 24/19 |
| 4,155,537 A * | 5/1979 | Bronson | F16G 11/12 | 24/909 |
| 4,157,171 A * | 6/1979 | Hasselas | F16G 11/12 | 24/68 CT |
| 4,297,046 A * | 10/1981 | McGill | F16G 11/12 | 152/242 |
| 4,423,639 A * | 1/1984 | Grade | G01L 5/08 | 254/257 |
| 4,830,339 A * | 5/1989 | McGee | F16G 11/12 | 254/235 |
| 5,611,521 A * | 3/1997 | Grover | B25B 21/002 | 254/235 |

(Continued)

OTHER PUBLICATIONS

Lineman's hoist at www.cmworks.com.

*Primary Examiner* — Michael E Gallion
(74) *Attorney, Agent, or Firm* — The Concept Law Group Scott M. Garrett

(57) ABSTRACT

A lineman's hoist that can be operated by a drill or similar device by its engagement with the head bolt. The head bolt is freely disposed with a head shaft and the head bolt is threadably engaged with a threaded shaft to displace the threaded shaft with respect to the bolt shaft. Thus this can move and displace items or wires that may be connected to the first hoist hook or second hoist hook.

2 Claims, 5 Drawing Sheets

(56) References Cited

U.S. PATENT DOCUMENTS

| | | | | |
|---|---|---|---|---|
| 5,671,822 | A * | 9/1997 | Phillips | A62B 1/04 182/191 |
| 6,945,516 | B1 * | 9/2005 | Scott | B60P 7/083 254/231 |
| 7,055,804 | B2 * | 6/2006 | Scott | B60P 7/083 254/231 |
| 7,509,711 | B2 * | 3/2009 | Hsieh | F16G 11/12 24/68 CD |
| 7,552,913 | B1 * | 6/2009 | Amoss | F16G 11/12 254/233 |
| 8,505,879 | B2 * | 8/2013 | Ruan | B25B 13/48 254/232 |
| 9,453,557 | B2 * | 9/2016 | Chou | F16G 11/12 |
| 2008/0118324 | A1 * | 5/2008 | Fritel | F16G 11/12 410/100 |
| 2008/0128669 | A1 * | 6/2008 | Lipke | A62B 1/06 254/389 |
| 2011/0000317 | A1 * | 1/2011 | Ruan | B60P 7/083 73/862.42 |
| 2011/0176884 | A1 * | 7/2011 | Ruan | B25B 13/48 410/103 |
| 2011/0253956 | A1 * | 10/2011 | Smetz | F16G 3/006 254/100 |
| 2013/0112929 | A1 * | 5/2013 | Xiao | B60P 7/083 254/237 |
| 2014/0326935 | A1 * | 11/2014 | Chao | B60P 7/083 254/235 |

\* cited by examiner

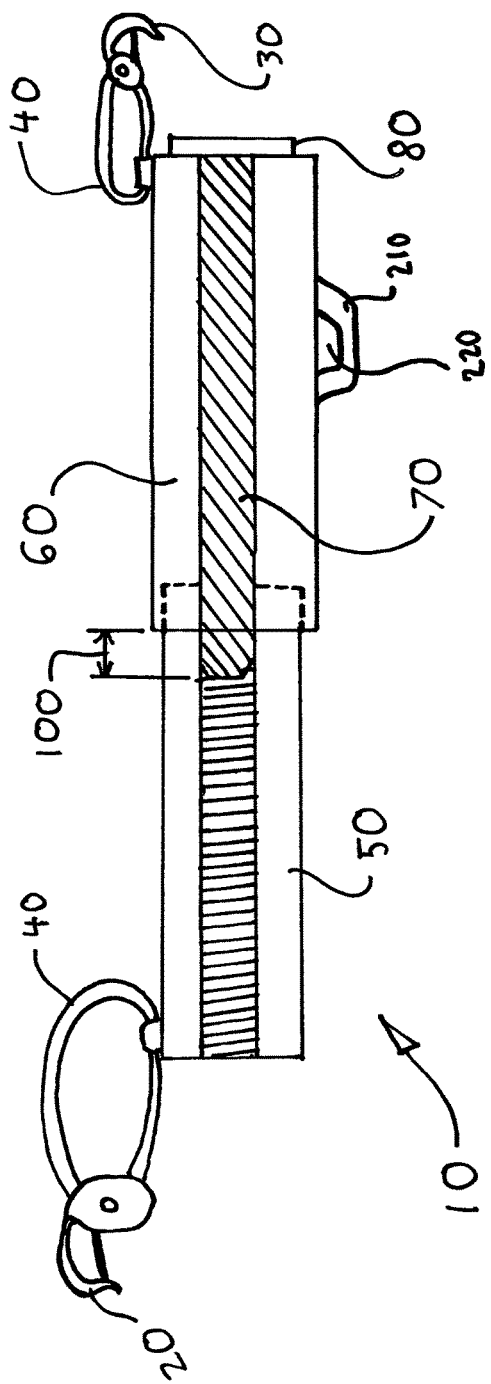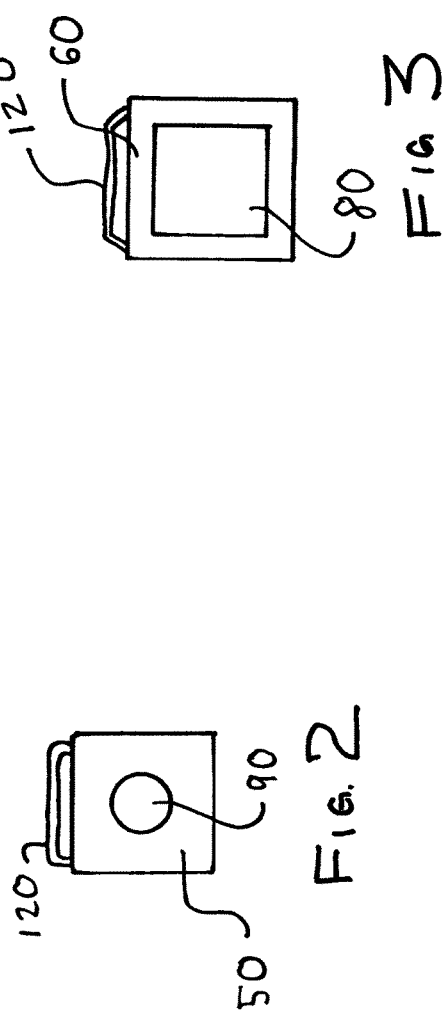

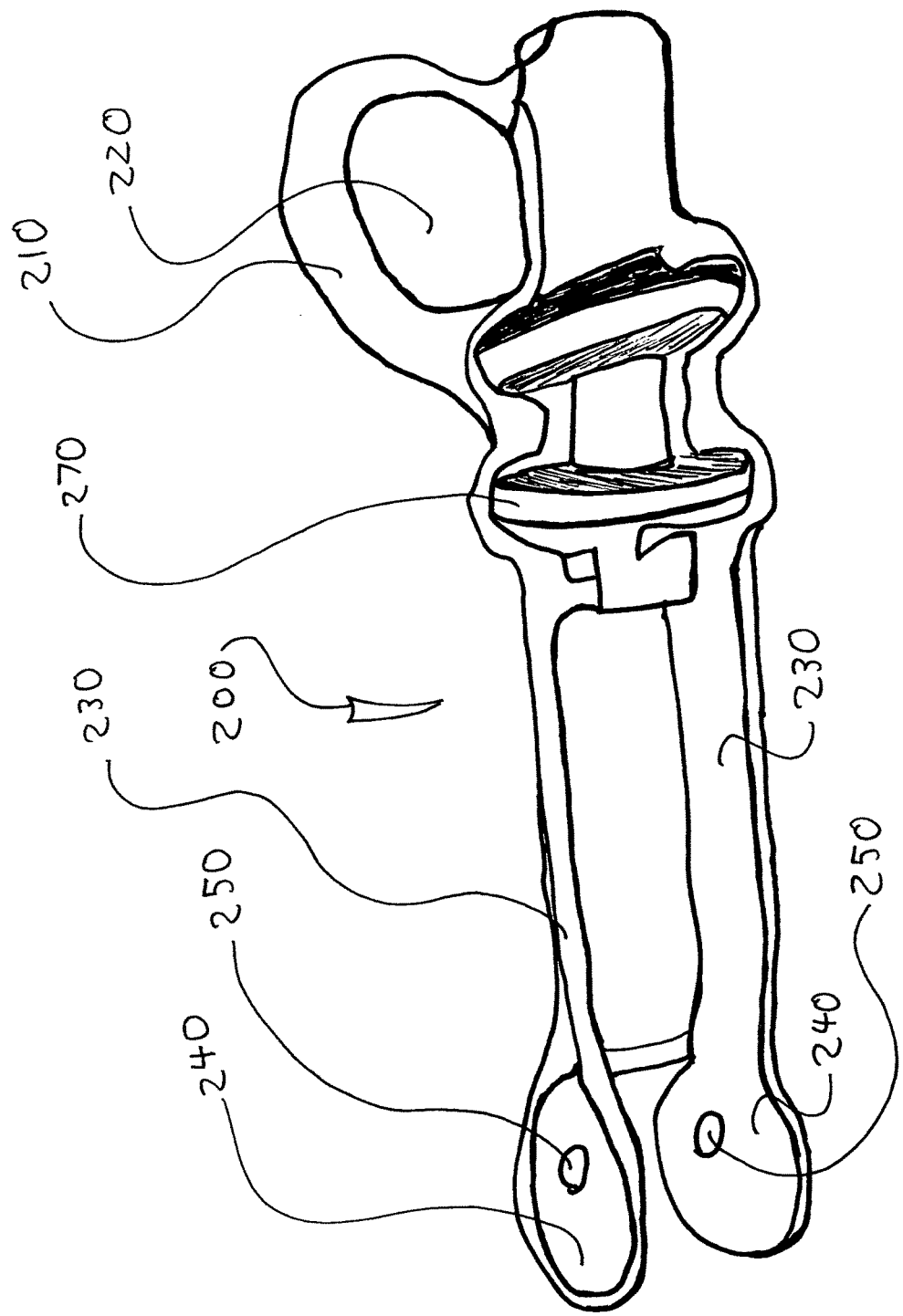

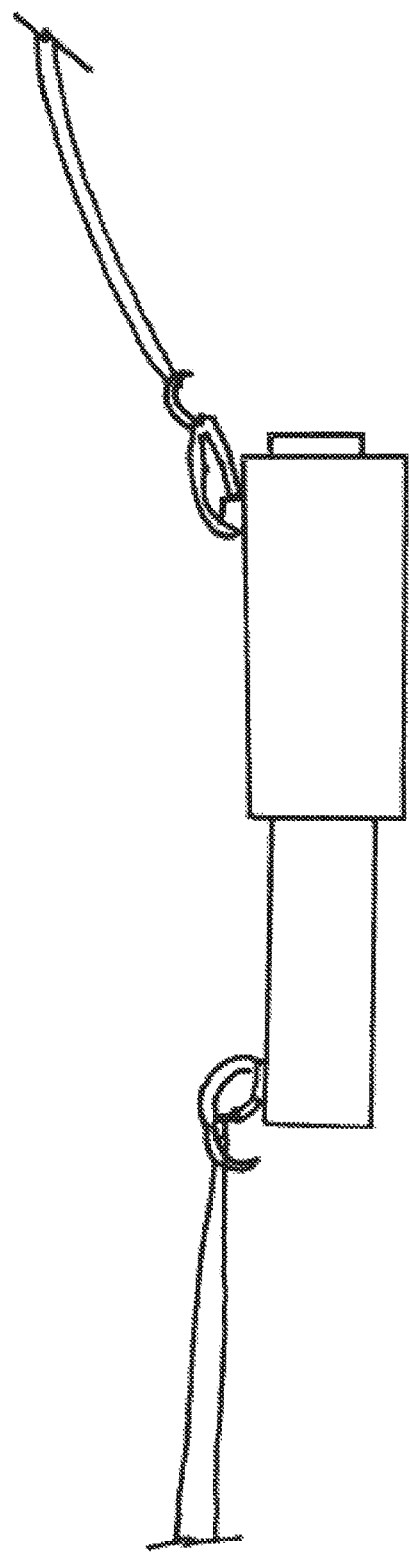

LINEMAN'S HOIST

RELATED APPLICATIONS

None.

FIELD OF INVENTION

This invention relates to lineman's hoists that are used for working on electrical poles or similar devices.

BACKGROUND OF THE INVENTION

A lineman is a tradesman who constructs and maintains electric power transmission and distribution facilities. The term is also used for those who install and maintain telephone, telegraph, cable TV and more recent fiber optic lines. It is also used to maintain most of the telephone poles in the world. The term refers to those who work in generally outdoor installation and maintenance jobs. Those who install and maintain electrical wiring inside buildings are electricians.

The current lineman's hoists are usually made of a strap and ratchet mechanism. One such hoist can be seen at www.cmworks.com. The hoist is usually used to pull wire together at elevated heights, usually working in a lift truck.

What is needed is a lineman's hoist that can displace or move a first hoist hook closer to the opposed second hoist hook quickly and safely.

Multiple embodiments of the system are disclosed herein. It will be understood that other objects and purposes of the invention, and variations thereof, will be apparent upon reading the following specification and inspecting the accompanying drawings.

SUMMARY OF INVENTION

One aspect of the present invention is a lineman's hoist, comprising: a bolt shaft; a threaded shaft; and a head bolt that can be disposed through said bolt shaft to be threadably engaged with said threaded shaft.

BRIEF DESCRIPTION OF THE DRAWINGS

For a fuller understanding of the invention, reference should be made to the following detailed description, taken in connection with the accompanying drawings, in which:

FIG. 1 is a pictorial view of one embodiment of the present invention with a square housing;

FIG. 2 is a pictorial of an embodiment of a left side view of the present invention of FIG. 1;

FIG. 3 is a pictorial of an embodiment of a right side view of the present invention of FIG. 1;

FIG. 4 is a pictorial of an embodiment of a dead end shoe of the present invention;

FIG. 8 is a pictorial view of using the present invention.

DETAILED DESCRIPTION OF THE PREFERRED EMBODIMENT

Figure 5:
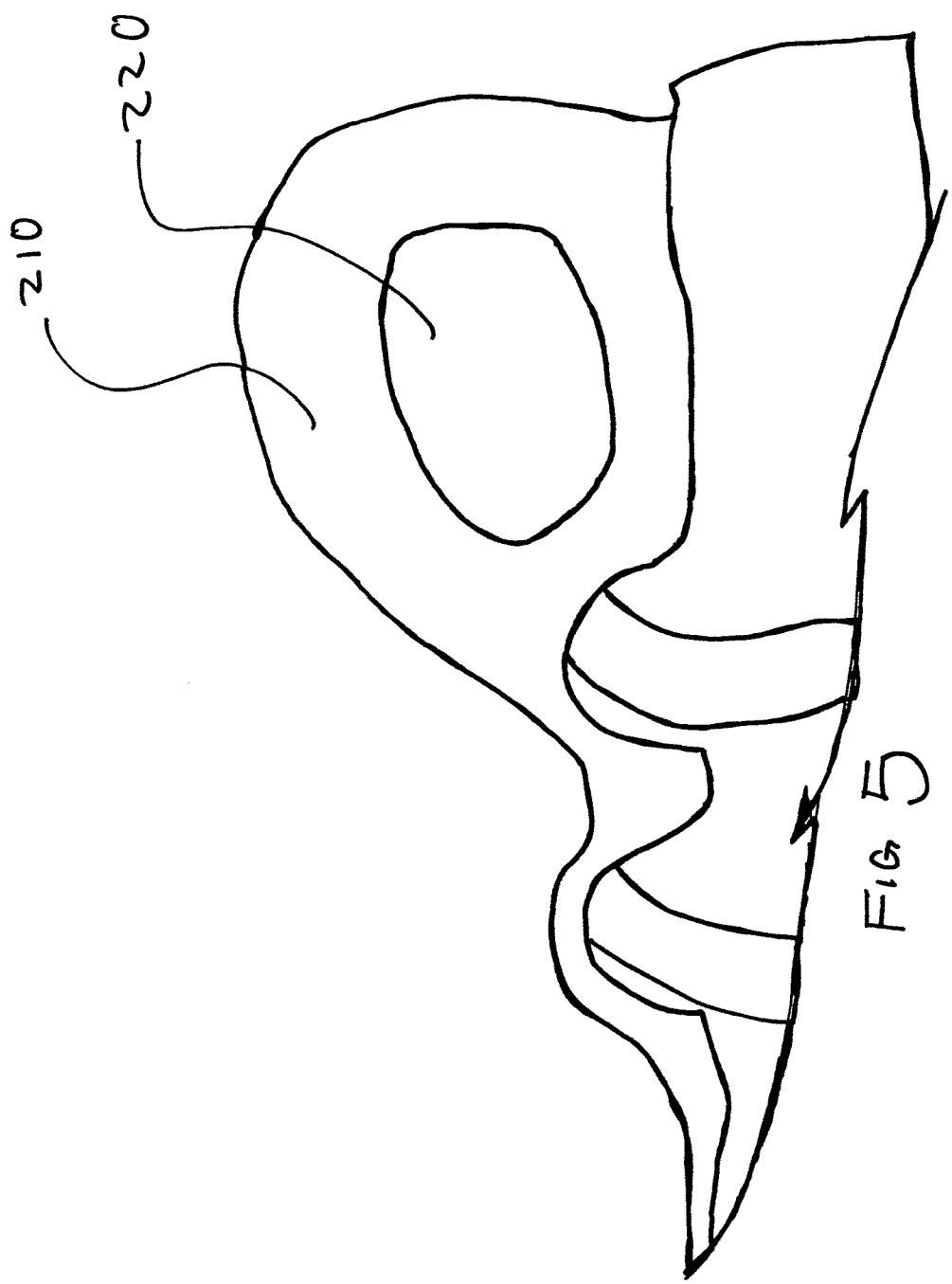
FIG. 5 is a pictorial view of an embodiment of a grab eye of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Certain terminology will be used in the following description for convenience and reference only, and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the system and designated parts. Said terminology will include the words specifically mentioned, derivatives, and similar words. Also, "connected to," "secured to," or similar language includes the definitions "indirectly connected to," "directly connected to," "indirectly secured to," and "directly secured to."

In the following detailed description of the preferred embodiments, reference is made to the accompanying drawings, which form a part hereof, and within which are shown by way of illustration specific embodiments by which the invention may be practiced. It is to be understood that other embodiments by which the invention may be practiced. It is to be understood that other embodiments may be utilized and structural changes may be made without departing from the scope of the invention.

The term "about" or "approximately" as used herein refers to being within an acceptable error range for the particular value as determined by one of ordinary skill in the art, which will depend in part on how the value is measured or determined, i.e. the limitations of the measurement system, i.e. the degree of precision required for a particular purpose.

REFERENCE NUMERALS 10 present invention
20 first hoist hook
30 second hoist hook
40 attachment means or nylon strap
50 threaded shaft
60 bolt shaft
70 head bolt
80 head end of head bolt
90 threaded through hole
100 extension distance
110 threaded end of head bolt
120 member
130 travel limiter
140 channel
150 arm
200 dead end shoe
210 grab eye
220 grab eye aperture
230 leg
240 disc
250 disc aperture FIG. 1 illustrates an embodiment of the present invention 10. The present invention 10 may be comprised of a threaded shaft 50 that may slide leftwardly and rightwardly with respect to a bolt shaft 60. The bolt shaft 60 may receive a head bold 70 therein. The head bold 70 may be threadably engaged with threads on the inside diameter of the threaded shaft 50. Whereby when the head bolt 70 rotates in a first direction the threaded shaft 50 moves leftwardly, and when the head bolt 70 rotates in a second direction the threaded shaft 50 moves rightwardly. The movement of the threaded shaft 50 is due to its threaded engagement with the threads of the head bold 70.

As illustrated in FIG. 1 the head bolt 70 may extend through the bold shaft 60 into the threaded shaft 60 so the threads of the threaded head bolt 70 can contact and engage with the threads disposed on the inside diameter of the threaded shaft 50. This is illustrated in FIG. 1 with reference numeral 100, and referred to as the extension distance 100. In one embodiment the extension distance 100 is ¼ of an inch. In another embodiment the extension distance 100 may be about 1 inch. The extension distance 100 can vary and can be as long as or longer than the length of both the threaded shaft 50 and the bolt shaft 60 combined.

FIG. 1 also illustrates a first hoist hook 20 disposed on the threaded shaft 50, and a second hoist hook 30 disposed on the bolt shaft 60. The threaded shaft 50 may be threadably engaged with the bolt shaft 60 so that the threaded shaft 50 can move in and out with respect to a bolt shaft 60.

The threaded shaft 50 may move or displace relative to the bolt shaft 60 by using a cordless drill or similar device by connecting to either the bolt shaft 60 or the threaded shaft 50. The cordless drill or similar device may connect to the head end of head bolt 80. As the head end of head bolt 80 is rotated clockwise, for example, the threaded shaft 50 may be displaced rightwardly or toward the head bolt 70; and as the head end of head bolt 80 is rotated counterclockwise, then the threaded shaft 50 may be displaced leftwardly or away from the head bolt 70.

FIG. 1 also illustrates a grab eye 210 having a grab eye aperture 220 on the lower side of the head bolt 70.

A first hoist hook 20 may be connected to a threaded shaft 50 via an attachment means 40. In one embodiment the attachment means 40 may be a strap 40. In one embodiment the attachment means may be a nylon or web strap 40.

A second hoist hook 30 may be connected to a bolt shaft 60 via an attachment means 40. In one embodiment the attachment means 40 may be a strap 40. In one embodiment the attachment means may be a nylon or web strap 40.

FIG. 2 illustrates a partial left side of FIG. 1 showing an embodiment of the threaded shaft 50 having a threaded through hole 90. The threaded end of head bolt 110 can be seen when looking in the threaded through hole 90 of the threaded shaft 50. FIG. 2 also illustrates a member 120 by which at least one of either the first hoist hook 20, or attachment means or nylon strap 40 may attach to the threaded shaft 50. The threaded shaft 50 is illustrated as having a square cross section, but the external cross section can be of any shape or configuration.

FIG. 3 illustrates a partial right view of the embodiment from FIG. 1. The square shape of the head end of head bolt 80 is illustrated. This is a common shaped head for bolts used in the lineman field. The member 120 is also illustrated by which at least one of either the second hoist hook 30 or attachment means 40 or nylon strap 40 may connect and be secured to the bolt shaft 60. The bolt shaft 60 may have a square cross section. In other embodiments the cross section can be of any shape or configuration.

FIG. 4 illustrates an embodiment of a dead end shoe 200 of the present invention. The dead end shoe 200 may have at a first end a having a grab eye 210 and a grab eye aperture 220. A leg 230 may extend to an opposed end and terminate at a disc 240. There may be two opposed legs 230. The disc 240 may have a disc aperture 250. The grab eye aperture 220 is used to place a hand line or other hoist through. Some embodiments of the present invention may not have the grab eye aperture.

FIG. 5 illustrates another embodiment of the first end of the dead end shoe 200 having a grab eye 210 and a grab eye aperture 220.

Figure 6:
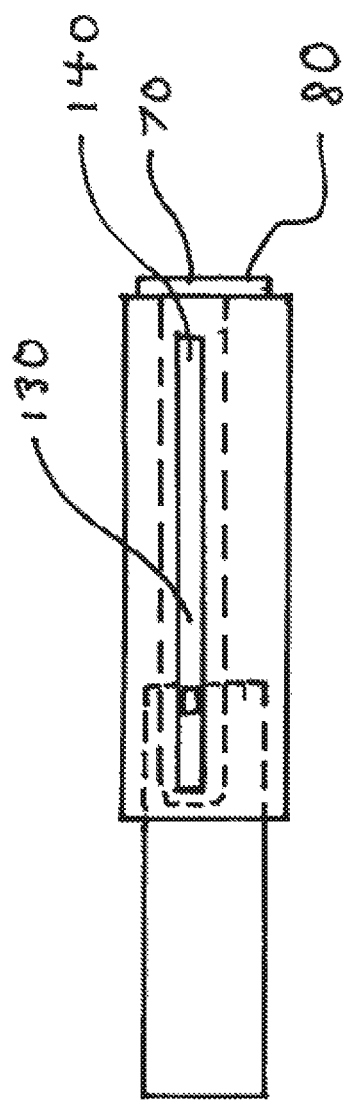
FIG. 6 is a pictorial view of an embodiment with a travel limiter.

FIG. 6 illustrates an embodiment of the present invention having a travel limiter 130. The travel limiter 130 limits the travel displacement of the threaded bolt 50. In one embodiment the travel limiter 130 may be made by the bolt shaft 60 having a channel 140 extending from the outside diameter to the inside diameter of the bolt shaft 60 but terminating at the edges to prevent the threaded shaft 50 cannot fall out of the bolt shaft 60. The threaded shaft 50 may have an arm 150 extending upwardly there from and extend in the channel 140. The arm 150 will contact the leftwardly and rightwardly edges of the channel 140 and stop the arm 150 from further displacement, thus preventing the threaded shaft 50 from further displacement.

Figure 7:
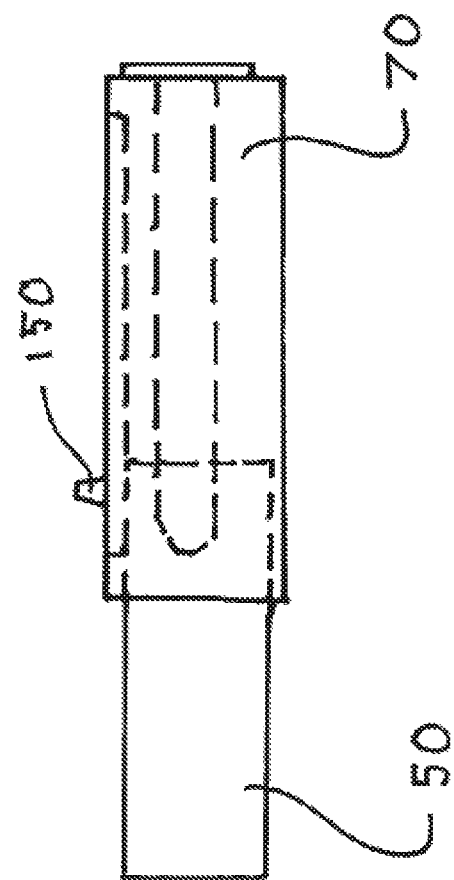
FIG. 7 is a pictorial view of an embodiment from FIG. 6.

FIG. 7 is a side view of the embodiment from FIG. 6.

FIG. 8 is a picture of a lineman using the present invention 10.

The present invention 10 may be produced in a variety of sizes. For example, a mid-size version may be available and adapted for a cordless drill and for household use.

A smaller size version may be available, for example the present invention 10 may between about 2 to about 6 inches The present invention 10 may be used for pulling or stretching fence such as barbed wire It should be understood, of course, that the foregoing relates to exemplary embodiments of the invention and that modifications may be made without departing from the spirit and scope of the invention as set forth in the following claims.

What is claimed is:

1. A lineman's hoist, comprising:
    a bolt shaft (60);
    a threaded shaft (50);
    a head bolt (70) that can be disposed through said bolt shaft to be threadably engaged with said threaded shaft (50); said head bolt (70) having a head (80) configured to be driven with a drill; a grab eye (210) having a grab eye aperture (220); said grab eye (210) affixed directly to said bolt shaft (60);
    whereby when said head bolt (70) rotates in a first direction the threaded shaft (50) moves leftwardly, and when said head bolt (70) rotates in a second direction the threaded shaft (50) moves rightwardly; said movement of the threaded shaft (50) is due to the threaded engagement of the threaded shaft with the threads of the head bolt (70) and movement of said head (80).

2. The lineman's hoist of claim 1, further comprising:
    a first hoist hook (20) connected to said threaded shaft (50); and
    a second hoist hook (30) connected to said bolt shaft (60).

* * * * *